United States Patent
Mori et al.

(10) Patent No.: US 9,702,788 B2
(45) Date of Patent: Jul. 11, 2017

(54) COMBUSTION RATIO CALCULATING METHOD FOR EXHAUST GAS HEATING APPARATUS

(75) Inventors: Toshihiro Mori, Gotenba (JP); Hidetaka Fuse, Susono (JP); Yoshiki Numata, Susono (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 415 days.

(21) Appl. No.: 14/372,259

(22) PCT Filed: Jan. 16, 2012

(86) PCT No.: PCT/JP2012/000222
§ 371 (c)(1),
(2), (4) Date: Jul. 15, 2014

(87) PCT Pub. No.: WO2013/108286
PCT Pub. Date: Jul. 25, 2013

(65) Prior Publication Data
US 2014/0343871 A1  Nov. 20, 2014

(51) Int. Cl.
*G01M 15/10* (2006.01)
*F01N 3/36* (2006.01)
(Continued)

(52) U.S. Cl.
CPC .......... *G01M 15/102* (2013.01); *F01N 3/025* (2013.01); *F01N 3/2033* (2013.01); *F01N 3/36* (2013.01);
(Continued)

(58) Field of Classification Search
CPC ................. G01M 15/102; F01N 3/025
(Continued)

(56) References Cited

U.S. PATENT DOCUMENTS 6,230,103 B1 * 5/2001 DeCorso ............. G01N 33/004
60/39.27
7,071,002 B1 * 7/2006 Tefft ..................... G01M 15/102
422/83
(Continued)

FOREIGN PATENT DOCUMENTS

JP  2003-207128 A   7/2003
JP  2004-309038 A   11/2004
(Continued)

*Primary Examiner* — Ricky Ngon
(74) *Attorney, Agent, or Firm* — Andrews Kurth Kenyon LLP (57) ABSTRACT

In a method according to the present invention for calculating the combustion ratio $R_C$ of fuel added to an exhaust passage, the temperature $T_o$ of the exhaust gas flowing in the exhaust passage located downstream of a region in which the fuel added to the exhaust passage is burned is acquired; the thermal capacity $C_E$ of the exhaust gas is acquired; the energy quantity $Q_F$ of the fuel supplied to the exhaust passage is acquired; an increase $\Delta T_o$ in exhaust temperature $T_o$ immediately before the exhaust gas is heated is obtained; a change ratio $dT_o$ of the exhaust temperature $T_o$ immediately before the exhaust gas is heated is obtained; a parameter $Z$ relevant to the exhaust gas flowing in the exhaust passage is acquired; and the combustion ratio $R_C$ of the fuel added to the exhaust passage is calculated in accordance with $R_C = (C_E/Q_F)(Z \cdot dT_o + \Delta T_o)$.

14 Claims, 6 Drawing Sheets (51) Int. Cl.
    *F01N 3/025*       (2006.01)
    *F01N 3/20*        (2006.01)
    *F01N 9/00*        (2006.01)
    *F02D 41/14*      (2006.01)
    *G01M 15/04*     (2006.01)

(52) U.S. Cl.
    CPC ........... F01N 9/00 (2013.01); F02D 41/1458 (2013.01); G01M 15/042 (2013.01); G01M 15/048 (2013.01); *F01N 2560/06* (2013.01); *F01N 2900/1404* (2013.01); *Y02T 10/26* (2013.01); *Y02T 10/47* (2013.01)

(58) Field of Classification Search
    USPC ........................................................ 702/23
    See application file for complete search history.

(56) References Cited

U.S. PATENT DOCUMENTS 8,073,638 B2 * 12/2011 Birk .................... F02D 41/0025
                                                            123/295
2012/0131992 A1 * 5/2012 Fushiki .................... F01N 9/00
                                                            73/114.75

FOREIGN PATENT DOCUMENTS

| JP | 2005-256633 A | 9/2005 |
| --- | --- | --- |
| JP | 2010-084710 A | 4/2010 |
| JP | 2010-510440 A | 4/2010 |
| JP | 2010-203238 A | 9/2010 |
| JP | 2011-80399 A | 4/2011 |
| JP | 2013-160144 A | 8/2013 |

* cited by examiner

COMBUSTION RATIO CALCULATING METHOD FOR EXHAUST GAS HEATING APPARATUS

CROSS-REFERENCE TO RELATED APPLICATIONS

This is a national phase application based on the PCT International Patent Application No. PCT/JP2012/000222 filed Jan. 16, 2012, the entire contents of which are incorporated herein by reference.

TECHNICAL FIELD

The present invention relates to a method for calculating a combustion ratio of fuel to be added to an exhaust passage when exhaust gas is heated by using an exhaust gas heating apparatus disposed on the exhaust passage in an internal combustion engine.

BACKGROUND ART

In recent years, in order to cope with strict emission standards set on internal combustion engines, it is necessary to promote the activation of an exhaust gas purifying device at the start of an internal combustion engine, maintain its active state during the operation of the internal combustion engine, and so on. In this respect, Patent Literature 1 and the like propose internal combustion engines in which an exhaust gas heating apparatus is incorporated in an exhaust passage upstream of an exhaust gas purifying device. This exhaust gas heating apparatus generates heated gas within exhaust gas and supplies this generated heated gas within exhaust gas and supplies this generated heating gas into the exhaust gas purifying device disposed downstream, to thus promote the activation of the exhaust gas purifying device and maintain its active state. To do so, the exhaust gas heating apparatus generally includes a fuel addition valve which adds fuel to the exhaust passage, and an igniting device such as a glow plug which heats and ignites the fuel to generate heated gas.

It is important to grasp the ignition status of the fuel added to the exhaust passage in the above-described exhaust gas heating apparatus. It may be desirable to stop the operation, as required, even during the operation of the exhaust gas heating apparatus. However, the conventional exhaust gas heating apparatus cannot meet the demand.

An intake air heating apparatus for use in an internal combustion engine or the like disclosed in Patent Literature 2 or Patent Literature 3 is adopted to detect an ignition temperature of fuel added to a combustor, and then, to determine a flame failure in the case where the detected temperature is lower than a predetermined value, thereby stopping fuel addition to the combustor.

CITATION LIST

Patent Literature

PTL1: Japanese Patent Laid-Open No. 2010-084710
PTL2: Japanese Patent Laid-Open No. 2003-207128
PTL3: Japanese Patent Laid-Open No. 2004-309038

SUMMARY OF INVENTION

Technical Problem

In Patent Literature 2, in the case where an intake temperature is detected when fuel is ignited, it is determined at a temperature convergence stage after combustion whether fuel is ignited or whether a flame fails. Therefore, in the case of a flame failure till the convergence of the intake temperature, there is a fear that unburned fuel is supplied to an engine side by a quantity according to the period of the flame failure. In view of this, an exhaust gas purifying device may be adversely affected in the case where the technique disclosed in Patent Literature 2 is diverted to the exhaust gas heating apparatus.

In Patent Literature 3, it is determined whether or not a flame failure will happen based on a change in temperature when fuel added to an intake passage is ignited. However, it is impossible to determine ignition or a flame failure until the change in temperature is stabilized in this method, either. Patent Literature 3 also yields a detriment similar to that in Patent Literature 2.

Moreover, in Patent Literature 2 and 3, the change in temperature during a certain fuel addition period is measured, and therefore, it is essentially impossible to determine ignition or a flame failure in real time. In addition, since an influence caused by a change in temperature of outside air flowing into a combustor or the like is not at all taken into consideration, the determination accuracy is markedly susceptible to improvement.

An object of the present invention is to provide a method capable of estimating, in real time with high reliability, a combustion ratio of fuel to be added to an exhaust passage by an exhaust gas heating apparatus. Incidentally, the combustion ratio herein signifies a ratio of fuel that is actually burned to a fuel energy supply quantity, that is, a fuel addition quantity. For example, a combustion ratio of 0% indicates that added fuel is not at all burned: in contrast, a combustion ratio of 100% indicates that fuel is completely burned.

Solution to Problem

A combustion ratio calculating method according to the present invention for calculating the combustion ratio of fuel added to an exhaust passage in an internal combustion engine when the fuel is added to the exhaust passage, and then, the fuel added to the exhaust passage is heated to be ignited, so that exhaust gas to be discharged from the internal combustion engine is heated, the method including the steps of: acquiring, by an exhaust temperature sensor, the temperature $T_o$ of the exhaust gas flowing in the exhaust passage located downstream of a region in which the fuel added to the exhaust passage is burned; acquiring the thermal capacity $C_E$ of the exhaust gas; acquiring the energy quantity $Q_F$ of the fuel supplied to the exhaust passage; obtaining an increase $\Delta T_o$ in exhaust temperature $T_o$ immediately before the exhaust gas is heated; obtaining a change ratio $dT_o$ of the exhaust temperature $T_o$ immediately before the exhaust gas is heated; acquiring a parameter Z relevant to the exhaust gas flowing in the exhaust passage; and calculating the combustion ratio $R_C$ of the fuel added to the exhaust passage in accordance with $R_C=(C_E/Q_F)(Z \cdot dT_o + \Delta T_o)$.

In the case where reference character $C_S$ represents the thermal capacity of the exhaust temperature sensor and reference character Q represents an energy quantity of heat transmitted from the exhaust gas flowing in the exhaust passage to the exhaust temperature sensor, the change ratio $dT_o$ of the exhaust temperature $T_o$ detected by the exhaust temperature sensor can be expressed by the following equation:

$$dT_o = Q/C_S \qquad (1)$$

Moreover, when reference characters $z_3$ and $z_5$ represent constants, reference character $T_E$ represents an exhaust temperature around the exhaust temperature sensor, reference character $\kappa_S$ represents the thermal conductivity of the exhaust temperature sensor per se, and reference character $\kappa_E$ represents the conductivity of the heat transmitted from the exhaust gas flowing in the exhaust passage to the exhaust temperature sensor, the heat energy quantity Q is expressed based on the general heat transfer law by the following equation:

$$Q=(T_E-T_o)/\{(1/z_3 \cdot \kappa_S)+(1/z_5 \cdot \kappa_E)\} \quad (2)$$

Here, when Equation (2) is substituted into Equation (1), the exhaust temperature $T_E$ can be expressed by the following equation:

$$T_E=C_S \cdot dT_o\{(1/z_3 \cdot \kappa_S) \pm (1/z_5 \cdot \kappa_E)\}+T_o \quad (3)$$

Meanwhile, when reference character $T_{os}$ represents the temperature of the exhaust gas flowing in the exhaust passage immediately before the fuel is added, the exhaust temperature $T_E$ around the exhaust temperature sensor in consideration of the combustion ratio $R_C$ is expressed by the following equation:

$$T_E=(Q_F \cdot R_C/C_E)+T_{os} \quad (4)$$

Here, when Equation (4) is substituted into Equation (3), the combustion ratio $R_C$ is expressed by the following equation:

$$R_C=(C_E/Q_F) \cdot [C_S \cdot dT_o\{(1/z_3 \cdot \kappa_S)+(1/z_5 \cdot \kappa_E)\}+T_o-T_{os}] \quad (5)$$

The term $\{(1/z_3 \cdot \kappa_S)+(1/z_5 \cdot \kappa_E)\}$ in Equation (5) may be expressed as the parameter Z relevant to the exhaust gas flowing in the exhaust passage. Therefore, when the term $(T_o-T_{os})$ is expressed by the increase $\Delta T_o$ in exhaust temperature, Equation (5) is modified to the following equation:

$$R_C=(C_E/Q_F)(Z \cdot dT_o+\Delta T_o) \quad (6)$$

In the combustion ratio calculating method according to the present invention, an exhaust gas purifying device may be incorporated on the way of the exhaust passage, the fuel may be added to the exhaust passage located upstream of the exhaust gas purifying device, and the exhaust temperature sensor may detect the temperature $T_o$ of the exhaust gas flowing in the exhaust passage located upstream of the exhaust gas purifying device.

The parameter Z includes at least one of the thermal conductivity $\kappa_S$ of the exhaust temperature sensor per se, the thermal capacity $C_S$ of the exhaust temperature sensor, and the conductivity $\kappa_E$ of heat transmitted from the exhaust gas flowing in the exhaust passage to the exhaust temperature sensor, and further, if $z_1$, $z_2$, $z_3$, $z_4$, and $z_5$ are constants, $Z=z_1 \cdot C_S$, $Z=z_2 \cdot C_S\{1/(z_3 \cdot \kappa_S)\}$, $Z=z_4 \cdot C_S\{1/(z_5 \cdot \kappa_E)\}$, or $Z=C_S[\{1/(z_3 \cdot \kappa_S)\}+\{1/(z_5 \cdot \kappa_E)\}]$.

The combustion ratio calculating method may further include the step of correcting the exhaust temperature $T_o$ based on at least either the flow rate $v_E$ of the exhaust gas flowing in the exhaust passage or the exhaust temperature $T_o$.

The combustion ratio calculating method may further include the steps of: acquiring the temperature $T_I$ of the exhaust gas flowing in the exhaust passage located downstream of a combustion chamber in the internal combustion engine and upstream of a region in which the fuel is added to the exhaust passage; obtaining an increase $\Delta T_I$ in exhaust temperature $T_I$ immediately before the exhaust gas is heated; obtaining the change ratio $dT_I$ of the exhaust temperature $T_I$ immediately before the exhaust gas is heated; and subtracting the increase $\Delta T_I$ in exhaust temperature $T_I$ from the increase $\Delta T_o$ in exhaust temperature $T_o$ immediately before the exhaust gas is heated, thus correcting the increase $\Delta T_o$ in exhaust temperature $T_o$. In this case, the combustion ratio calculating method may further include the step of subtracting the change ratio $dT_I$ of the exhaust temperature $T_I$ from the change ratio $dT_o$ of the exhaust temperature $T_o$ immediately before the exhaust gas is heated, thus correcting the change ratio $dT_o$ of the exhaust temperature $T_o$.

The combustion ratio calculating method may further include the step of obtaining a difference $\Delta dT$ between the change ratio $dT_o$ of the exhaust temperature $T_o$ and the change ratio $dT_I$ of the exhaust temperature $T_I$, wherein immediately before the exhaust gas being heated indicates a timing at which the difference $\Delta dT$ between the change ratio $dT_o$ and the change ratio $dT_I$ exceeds a predetermined value S.

The combustion ratio calculating method may further include the step of determining whether or not the change ratio $dT_o$ of the exhaust temperature $T_o$ after a lapse of a predetermined time t after the fuel addition to the exhaust passage is started is equal to or greater than a preset threshold, wherein if the change ratio $dT_o$ of the exhaust temperature $T_o$ after the lapse of the predetermined time t after the fuel addition to the exhaust passage is started is smaller than the threshold, the combustion ratio of the fuel is calculated to be 0. In this case, the predetermined time t may include a time when the exhaust gas flows from a fuel addition region at the exhaust passage to a detection region, in which the exhaust temperature $T_o$ is detected. Moreover, in the case where the combustion ratio calculating method further includes the steps of: acquiring the volume $A_E$ of the exhaust passage from the fuel addition region at the exhaust passage to the detection region, in which the exhaust temperature $T_o$ is detected; and acquiring the flow rate q of the exhaust gas flowing in the exhaust passage per unit time, the predetermined time t may be expressed $A_E/q$. Furthermore, the combustion ratio calculating method may further include the step of correcting the predetermined time t based on the exhaust temperature $T_o$ detected by the exhaust temperature sensor. In this case, when p represents an exhaust pressure and W represents the mass of the exhaust gas per unit time, the predetermined time t may be corrected in accordance with the equation: $t=(1293p \cdot A_E)/\{101.3W(1+0.00367T_o)\}$.

The combustion ratio calculating method may further include the step of obtaining the difference $\Delta dT$ between the change ratio $dT_o$ of the exhaust temperature $T_o$ after the fuel addition to the exhaust passage is finished and the change ratio $dT_I$ of the exhaust temperature $T_I$, wherein the step of calculating the combustion ratio $R_C$ of the fuel may be finished at a point in time at which the difference $\Delta dT$ between the change ratio $dT_o$ and the change ratio $dT_I$ becomes equal to or smaller than a predetermined value F. Alternatively, the step of calculating the combustion ratio $R_C$ of the fuel may be finished immediately before the exhaust gas is heated and after a lapse of time required for adding the fuel to the exhaust passage.

Advantageous Effects of Invention

With the combustion ratio calculating method according to the present invention, the combustion ratio $R_C$ of the fuel added to the exhaust passage is calculated in accordance with the equation: $R_C=(C_E/Q_F)(Z \cdot dT_o+\Delta T_o)$. Thus, it is possible to accurately grasp the combustion ratio in real time.

The fuel is added to the exhaust passage located upstream of the exhaust gas purifying device, and further, the exhaust temperature sensor detects the temperature $T_o$ of the exhaust gas flowing in the exhaust passage located upstream of the exhaust gas purifying device. In this case, it is possible to estimate the quantity of unburned fuel flowing into the exhaust gas purifying device with high accuracy.

In the case where the parameter Z is any one of $z_1 \cdot C_S$, $z_2 \cdot C_S \{1/(z_3 \cdot \kappa_S)\}$, $z_4 \cdot C_S \{1/(z_5 \cdot \kappa_E)\}$, and $C_S[\{1/(z_3 \cdot \kappa_S)\} + \{1/(z_5 \cdot \kappa_E)\}]$, it is possible to grasp the combustion ratio of the fuel added to the exhaust passage with high reliability.

In the case where the combustion ratio calculating method further includes the step of correcting the exhaust temperature $T_o$ based on at least either the flow rate $v_E$ of the exhaust gas flowing in the exhaust passage or the exhaust temperature $T_o$, it is possible to grasp the combustion ratio with higher accuracy.

In the case where the increase $\Delta T_o$ in exhaust temperature is corrected, and further, the change ratio $dT_o$ of the exhaust temperature is corrected, it is possible to take an influence by the change in temperature of the exhaust gas flowing into the exhaust gas heating apparatus into consideration. In particular, in the case where the combustion ratio calculating method further includes the step of correcting the exhaust temperature $T_I$ based on at least either the flow rate $v_E$ of the exhaust gas flowing in the exhaust passage or the exhaust temperature $T_o$, it is possible to grasp the combustion ratio of the fuel added to the exhaust passage with much higher accuracy.

In the case where the timing at which the difference between the change ratio $dT_o$ of the exhaust temperature $T_o$ and the change ratio $dT_I$ of the exhaust temperature $T_I$ exceeds the predetermined value is defined as a timing immediately before the exhaust gas is heated, it is possible to precisely define the calculation starting timing of the combustion ratio even if the exhaust temperature sensor is apart from the exhaust gas heating apparatus.

In the case where the change ratio $dT_o$ of the exhaust temperature $T_o$ after the lapse of the predetermined time t after the fuel addition to the exhaust passage is started is smaller than a threshold, the combustion ratio of the fuel is calculated to be 0. Thus, it is possible to prevent an inconvenience in which the fuel to be added to the exhaust passage is kept unburned. Here, in the case where the predetermined time t includes a time when the exhaust gas flows from the fuel addition region at the exhaust passage to the detection region, in which the exhaust temperature $T_o$ is detected, and particularly, the predetermined time t is assumed to be $A_E/q$, it is possible to determine a combustion ratio of 0 at a proper timing according to the distance between the exhaust gas heating apparatus and the exhaust temperature sensor. Moreover, in the case where the predetermined time t is corrected based on the exhaust temperature $T_o$ detected by the exhaust temperature sensor, in particular, it is corrected in accordance with the following equation: $t=(1293p-A_E)/\{101.3W(1+0.00367T_o)\}$, it is possible to calculate the combustion ratio with higher reliability.

In the case where the step of calculating the combustion ratio $R_C$ of the fuel is ended at the timing at which the difference between the change ratio $dT_o$ of the exhaust temperature $T_o$ and the change ratio $dT_I$ of the exhaust temperature $T_I$ after the fuel addition to the exhaust passage is finished becomes equal to or smaller than a predetermined value, it is possible to predict a combustion finish timing with accuracy. Consequently, it is possible to calculate the combustion ratio with higher accuracy. Also in the case where the step of calculating the combustion ratio $R_C$ of the fuel is ended at a timing after the lapse of time required for adding the fuel to the exhaust passage immediately before the exhaust gas is heated, a similar advantageous result can be produced.

DESCRIPTION OF EMBODIMENTS

An embodiment in which a combustion ratio calculating method according to the present invention is applied to a compression-ignition multicylinder internal combustion engine will be described below in detail with reference to FIG. 1 to FIG. 6. However, the present invention is not limited to only the embodiment, and the construction thereof may be freely modified according to required characteristics. The present invention is effectively applied to a spark ignition type internal combustion engine in which gasoline, alcohol, LNG (Liquefied Natural Gas), or the like is used as fuel to be ignited by a spark plug, for example.

Figure 1:
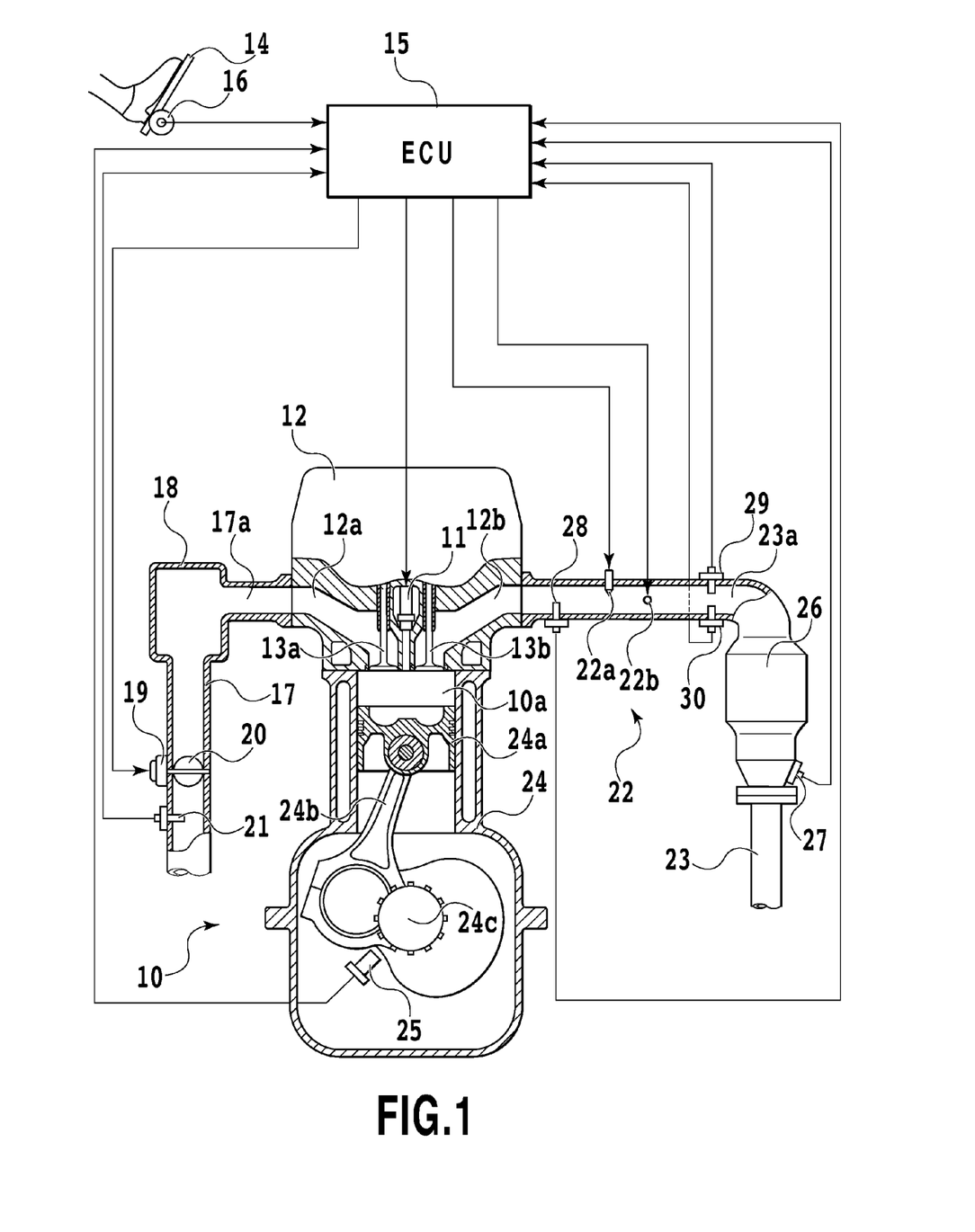
FIG. 1 is a conceptual diagram illustrating an embodiment, in which a combustion ratio calculating method according to the present invention is applied to a compression-ignition multicylinder internal combustion engine.
Figure 2:
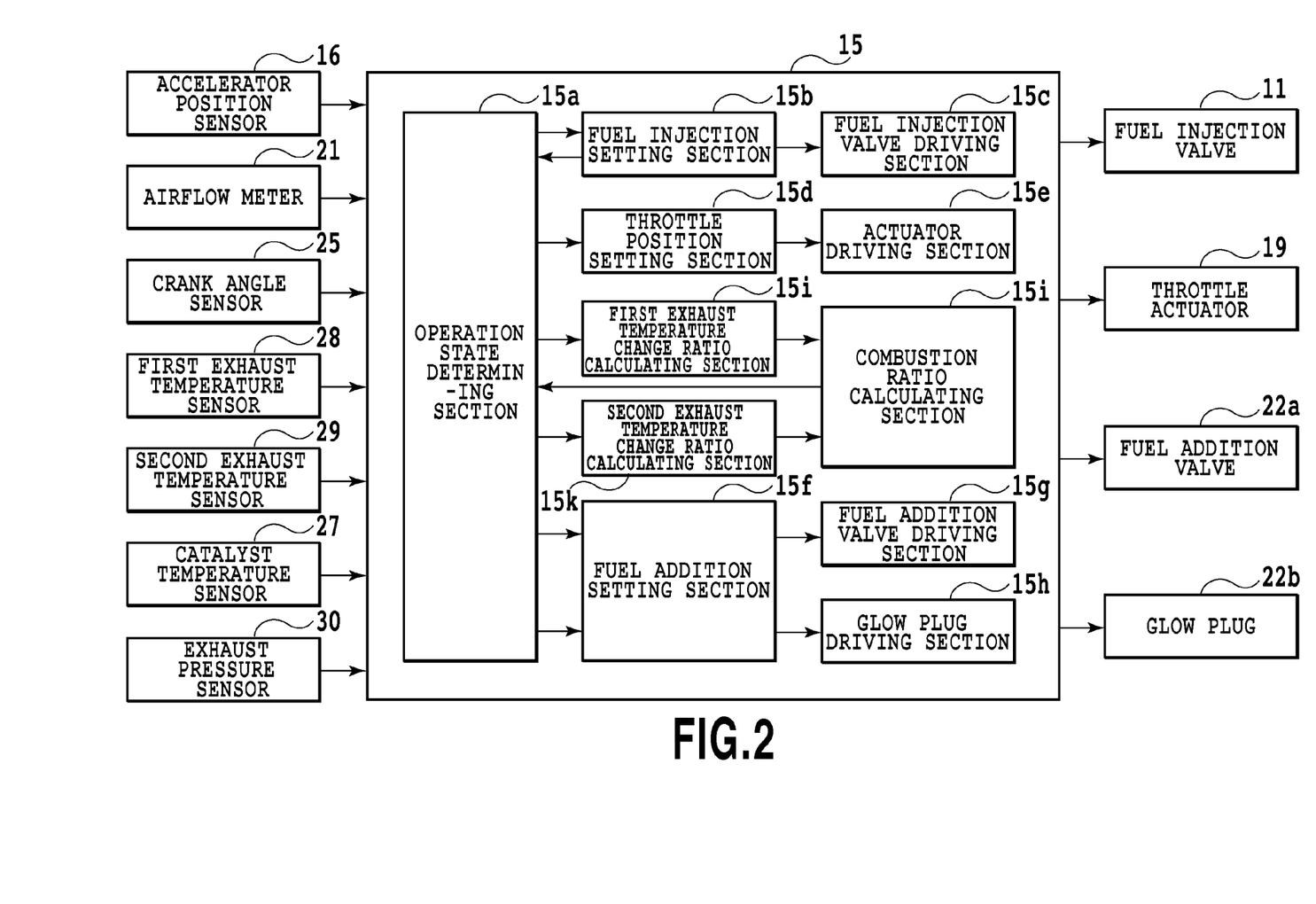
FIG. 2 is a control block diagram illustrating principal parts of the embodiment illustrated in FIG. 1.

FIG. 1 schematically illustrates principal parts of an engine system in the present embodiment. FIG. 2 schematically illustrates a control block for the principal parts. The following parts are omitted from FIG. 1: not only a valve mechanism and a muffler for taking in air and discharging exhaust gas in an engine 10 but also an exhaust turbocharger, an EGR system, and the like which are generally used as auxiliary machines for the engine 10. Furthermore, it should be noted that some of various sensors required for a smooth operation of the engine 10 are omitted for the sake of convenience.

The engine 10 in the present embodiment is a compression-ignition multicylinder internal combustion engine that spontaneously ignites light oil as a fuel by injecting the fuel directly into a combustion chamber 10a in a compressed state through fuel injection valve 11. However, the engine 10 may be a single cylinder internal combustion engine in view of the features of the present invention.

A cylinder head 12 includes an intake port 12a and an exhaust port 12b formed therein and exposed to the combustion chamber 10a, and incorporates a valve mechanism, not illustrated, including an intake valve 13a that opens and closes the intake port 12a and an exhaust valve 13b that opens and closes the exhaust port 12b. The fuel injection valve 11 exposed to the center of the upper end of the combustion chamber 10a also is assembled to the cylinder head 12 in such a manner as to be held between the intake valve 13a and the exhaust port 13b. A quantity and an injection timing of fuel supplied into the combustion chamber 10a through the fuel injection valve 11 are controlled by an ECU (Electronic Control Unit) 15 based on the operation state of a vehicle including the position of an accelerator pedal 14 pressed by a driver. The position of the pressed accelerator pedal 14 is detected by an accelerator position sensor 16. The detection information is input into the ECU 15.

The ECU 15 includes an operation state determining section 15a that determines the operation state of the vehicle based on information output from the accelerator position sensor 16 or various sensors, described later, a fuel injection setting section 15b, and a fuel injection valve driving section 15c. The fuel injection setting section 15b sets the quantity and injection timing of fuel injected through the fuel injection valve 11 based on the determination result in the operation state determining section 15a. The fuel injection valve driving section 15c controls the operation of the fuel injection valve 11 such that the quantity of fuel set in the fuel injection setting section 15b is injected through the fuel injection valve 11 at the set timing.

A surge tank 18 is formed on the way of an intake pipe 17 that is connected to the cylinder head 12 so as to communicate with the intake port 12a and defines an intake passage 17a together with the intake port 12a. A throttle valve 20 adapted to adjust the opening degree of the intake passage 17a via a throttle actuator 19 is incorporated in the intake pipe 17 located upstream of the surge tank 18. Furthermore, an airflow meter 21 is attached to the intake pipe 17 located upstream of the throttle valve 20, for detecting the flow rate of intake air flowing through the intake passage 17a and sending the flow rate to the ECU 15. Instead of the airflow meter 21, an exhaust flow rate sensor having the same configuration as that of the airflow meter 21 may be attached to an exhaust pipe 23 positioned between an exhaust gas heating apparatus 22, described later, and the exhaust port 12b of the cylinder head 12.

The ECU 15 further includes a throttle position setting section 15d and an actuator driving section 15e. The throttle position setting section 15d not only sets the position of the accelerator pedal 14 but also sets the opening degree of the throttle valve 20 based on the determination result in the operation state determining section 15a. The actuator driving section 15e controls the operation of the throttle actuator 19 in such a manner as to open the throttle valve 20 at the opening degree set in the throttle position setting section 15d.

To a cylinder block 24, in which a piston 24a reciprocates, is attached a crank angle sensor 25 which detects a rotation phase, that is, a crank angle of a crankshaft 24c with the piston 24a connected thereto via a connecting rod 24b, and then, outputs it to the ECU 15. The operation state determining section 15a of the ECU 15 grasps the rotation phase of the crankshaft 24c, an engine speed, the travel speed of the vehicle, and the like in real time based on information output from the crank angle sensor 25.

The exhaust pipe 23 connected to the cylinder head 12 in such a manner as to communicate with the exhaust port 12b defines an exhaust passage 23a together with the exhaust port 12b. An exhaust gas purifying device 26 adapted to detoxify harmful substance generated by combustion of a gas mixture in the combustion chamber 10a is mounted on the way of the exhaust pipe 23 located upstream of the muffler, not illustrated, attached to a downstream end. The exhaust gas purifying device 26 in the present embodiment includes at least an oxidation catalyst but may incorporate a DPF (Diesel Particulate Filter), an $NO_X$ occluding catalyst, and the like. The oxidation catalyst is adapted to oxidize, that is, burn unburned gas mainly contained in exhaust gas. A catalyst temperature sensor 27 is incorporated on the exhaust passage 23a at an outlet side of the oxidation catalyst, for detecting the temperature of exhaust gas discharged from the oxidation catalyst (hereinafter referred to as a catalyst temperature) and then sending it to the ECU 15. The operation state determining section 15a in the ECU 15 grasps also whether or not the oxidation catalyst is in an active state based on information sent from the catalyst temperature sensor 27.

The exhaust gas heating apparatus 22 is provided on the way of the exhaust pipe 23 located upstream of the exhaust gas purifying device 26, for generating heated gas and supplying the heated gas to the exhaust gas purifying device 26 disposed downstream of the exhaust gas heating apparatus 22 so as to activate the heated gas and keep the active state. The exhaust gas heating apparatus 22 in the present embodiment includes a fuel addition valve 22a and a glow plug 22b. Additionally, an impinging plate disclosed in Patent Literature 1 may be provided for atomizing fuel supplied from the fuel supply valve 26 and promoting its flying toward the glow plug 22b, or an auxiliary oxidation catalyst may be disposed on the exhaust passage 23a downstream of the members. These measures may be effective.

The fuel addition valve 22a has the same basic configuration as that of the ordinary fuel injection valve 11 and is adapted to control an energization time so as to freely supply the fuel to the exhaust passage 23a in any quantities at any time intervals in a pulse manner.

A fuel addition setting section 15f of the ECU 15 sets a quantity of fuel to be supplied from the fuel addition valve 22a to the exhaust passage 23a at a time based on the vehicle operation state including an intake air quantity detected by the airflow meter 21 and an air-fuel ratio. Moreover, the fuel addition setting section 15f calculates an energy quantity of fuel to be supplied, that is, a fuel addition quantity $Q_F$ based on a difference between a target catalyst temperature and a current catalyst temperature detected by the catalyst temperature sensor 27. A lowest temperature, at which the oxidation catalyst becomes active, (hereinafter referred to as a lowest catalyst activation temperature) is generally selected as the target catalyst temperature.

Incidentally, in the present embodiment, the operation state determining section 15a of the ECU 15 is adapted to calculate an air-fuel ratio based on the intake air quantity and the fuel addition quantity $Q_F$ of fuel added from the fuel addition valve 22a. However, an air-fuel ratio sensor may be incorporated on the way of the exhaust passage 23a, and then, the air-fuel ratio may be read from a detection signal output from the air-fuel ratio sensor.

A fuel addition valve driving section 15g of the ECU 15 controls the operation of the fuel addition valve 22a such that a quantity of fuel set by the fuel addition setting section 15f is injected through the fuel addition valve 22a in a set cycle. In this case, the fuel addition valve 22a is basically operated until the fuel addition quantity integrated after the start of the fuel addition reaches the fuel addition quantity $Q_F$ set in the fuel addition setting section 15f.

The glow plug 22b for igniting the fuel added to the exhaust passage 23a through the fuel addition valve 22a is connected to a vehicle-installed power source, not illustrated, via a glow plug driving section 15h of the ECU 15, serving as an on/off switch. Thus, the glow plug 22b is controllably switched between an energized state and a non-energized state by the glow plug driving section 15h of the ECU 15 in accordance with a preset program.

In the present embodiment, in the case where the accelerator pedal 14 is released in a motoring state of the engine 10, that is, during the operation of the engine 10, thereby bringing about a fuel cut state of the engine 10, in which no fuel is injected through the fuel injection valve 11, the fuel is added through the fuel addition valve 22a. However, the fuel may be added through the fuel addition valve 22a according to the operation state of the vehicle, and then, may be ignited and burned by the glow plug 22b, thus heating exhaust gas discharged from the engine 10.

Consequently, the intake air supplied into the combustion chamber 10a through the intake passage 17a forms a gas mixture with the fuel injected into the combustion chamber 10a through the fuel injection valve 11. The gas mixture is spontaneously ignited in the vicinity of a compression top dead center of the piston 24a, and then, is burned. Resultant exhaust gas is discharged to the atmosphere from the exhaust pipe 23 through the exhaust gas purifying device 26. In contrast, when the engine 10 is turned into the fuel cut state, the fuel is supplied to the exhaust passage 23a through the fuel addition valve 22a, thereby increasing the temperature of the exhaust gas flowing in the exhaust passage 23a, and thus, maintaining the active state of the oxidation catalyst staying in the exhaust gas purifying device 26.

A first exhaust temperature sensor 28 is disposed on the exhaust pipe 23 located upstream of the exhaust gas heating apparatus 22. The first exhaust temperature sensor 28 detects the temperature $T_I$ of the exhaust gas flowing in the exhaust passage 23a located downstream of the combustion chamber 10a of the engine 10 and upstream of a region, in which the fuel is added to the exhaust passage 23a (hereinafter referred to as a first exhaust temperature), and then, sends it to the ECU 15. In the same manner, a second exhaust temperature sensor 29 and an exhaust pressure sensor 30 are disposed on the exhaust pipe 23 between the exhaust gas heating apparatus 22 and the exhaust gas purifying device 26. The second exhaust temperature sensor 29 detects the temperature $T_o$ of the exhaust gas flowing in the exhaust passage 23a located downstream of a region, in which the fuel added to the exhaust passage 23a is burned, and upstream of the exhaust gas purifying device 26 (hereinafter referred to as a second exhaust temperature), and then, sends it to the ECU 15. The exhaust pressure sensor 30 detects the pressure p of the exhaust gas flowing in the exhaust passage 23a, and then, sends it to the ECU 15.

A first exhaust temperature change ratio calculating section 15i of the ECU 15 calculates a change ratio $dT_I$ of the exhaust temperature $T_I$ immediately before the exhaust gas is heated (hereinafter referred to as a first exhaust temperature change ratio), and then, sends it to a combustion ratio calculating section 15j. In the same manner, a second exhaust temperature change ratio calculating section 15k of the ECU 15 calculates a change ratio $dT_o$ of the exhaust temperature $T_o$ immediately before the exhaust gas is heated (hereinafter referred to as a second exhaust temperature change ratio), and then, sends it to the combustion ratio calculating section 15j.

The combustion ratio calculating section 15j calculates the combustion ratio $R_C$ of the fuel added to the exhaust passage 23a in accordance with the following equation (7):

$$R_c = (C_E/Q_F)[C_S\{1/(z_3 \cdot \kappa_S)\} + \{1/(z_5 \cdot \kappa_E)\}] \cdot dT_o + \Delta T_o] \quad (7)$$

Here, reference character $C_E$ represents the thermal capacity of the exhaust gas; $Q_F$, a supply energy quantity; $C_S$, the thermal capacity of the second exhaust temperature sensor 29; $dT_o$, the second exhaust temperature change ratio; and $\Delta T_o$, an increase in second exhaust temperature. The supply energy quantity $Q_F$ is equivalent to the quantity of fuel to be added to the exhaust passage 23a, as described above. The increase $\Delta T_o$ in second exhaust temperature is equivalent to a value obtained by subtracting a second exhaust temperature $T_{os}$ immediately before the exhaust gas is heated from the second exhaust temperature $T_o$ at this point in time. Moreover, reference character $\kappa_S$ represents the thermal conductivity of the second exhaust temperature sensor 29 per se; $\kappa_E$, the conductivity of heat transmitted from the exhaust gas flowing in the exhaust passage 23a to the second exhaust temperature sensor 29; and $z_3$ and $z_5$, constants.

Here, the thermal capacity $C_E$ of the exhaust gas, a heat generation quantity per unit mass of the fuel to be used, the thermal capacity $C_S$ of the second exhaust temperature sensor 29, and the like are acquired and stored in the ECU 15 in advance. Furthermore, the term $C_S[\{1/(z_3 \cdot \kappa_S)\} + \{1/(z_5 \cdot \kappa_E)\}]$ in Equation (7) may be regarded as a parameter Z relevant to the exhaust gas flowing in the exhaust passage 23a, and therefore, Equation (7) may be expressed by Equation (6), as described already, as follows:

$$R_c = (C_E/Q_F)(Z \cdot dT_o + \Delta T_o) \quad (6)$$

In this case, the parameter Z relevant to the exhaust gas flowing in the exhaust passage 23a may be regarded as any one of $z_1 \cdot C_S$, $z_2 \cdot C_S\{1/(z_3 \cdot \kappa_S)\}$, and $z_4 \cdot C_S\{1/(z_5 \cdot \kappa_S)\}$, thereby simply calculating the combustion ratio $R_c$. Here, $z_1$, $z_2$, and $z_4$ are constants.

The conductivity $\kappa_E$ of the heat transmitted from the exhaust gas flowing in the exhaust passage 23a to the second exhaust temperature sensor 29 can be expressed by a function expression having a Nusselt number $N_u$ as a variable, that is, $\kappa_E = a \cdot f(N_u)$ by a general technique for calculating a thermal conductivity. Moreover, the function expression can be converted into a function expression having a Prandtl number $P_r$ and a Reynolds number $R_e$ as variables, that is, $\kappa_E = b \cdot f(P_r, R_e)$. As a consequence, the thermal conductivity $\kappa_E$ can be eventually replaced by a function expression having a flow rate $v_E$ of the exhaust gas flowing in the exhaust passage 23a, that is, $\kappa_E c \cdot f(V_E)$. In other words, the conductivity $\kappa_E$ of the heat transmitted from the exhaust gas flowing in the exhaust passage 23a to the second exhaust temperature sensor 29 out of the parameters Z in Equation (6) may be expressed by a function expression having the Nusselt number $N_u$, the Prandtl number $P_r$ and the Reynolds number $R_e$, or the flow rate $V_E$ of the exhaust gas flowing in the exhaust passage 23a as variables. Here, all of a to c in the above-described function expressions are constants that are stored in the combustion ratio calculating section 15j of the ECU 15.

Figure 3:
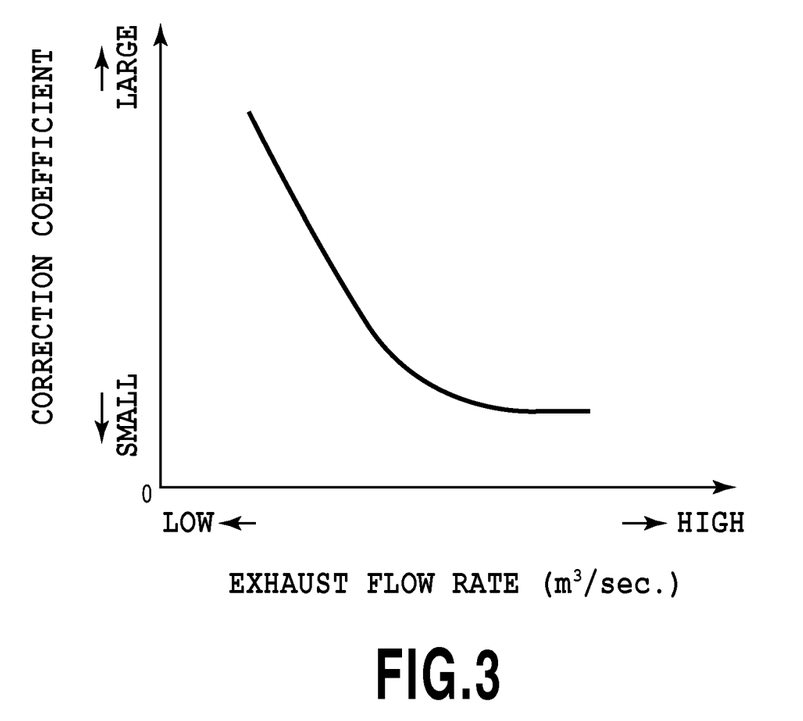
FIG. 3 is a map schematically illustrating the relationships of a correction coefficient to an exhaust flow rate and a second exhaust temperature.
Figure 4:
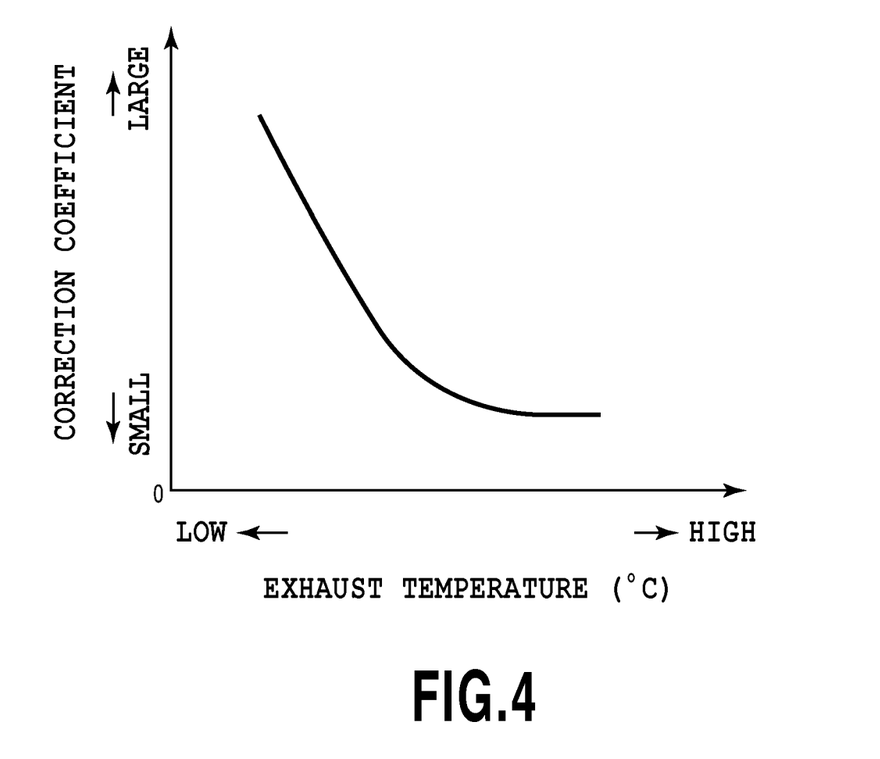
FIG. 4 is a map schematically illustrating the relationships of a correction coefficient to an exhaust temperature and a second exhaust temperature.

The temperatures $T_I$ and $T_o$ of the exhaust gas flowing in the exhaust passage 23a are not uniform within a plane perpendicular to the longitudinal axis of the exhaust passage 23a, and therefore, have distributions peculiar to the configuration of its exhaust system. Therefore, it is desirable to correct the temperatures detected by the first and second exhaust temperature sensors 28 and 29. In the present embodiment, the first and second temperatures $T_I$ and $T_o$ of the exhaust gas are designed to be corrected based on at least one of the flow rate $v_E$ of the exhaust gas flowing in the exhaust passage 23a and the second exhaust temperature $T_o$. In view of this, the operation state determining section 15a stores therein exhaust temperature correction maps illustrated in FIGS. 4 and 5. Based on the maps, the first and second temperatures $T_I$ and $T_o$ of the exhaust gas are corrected. The present embodiment assumes an exhaust system in which exhaust temperature detectors at the exhaust temperature sensors 28 and 29 are disposed in the vicinity of the pipe wall of the exhaust pipe 23, and thus, as the exhaust flow rate $v_E$ is increased, the mixed state of the exhaust gas flowing in the exhaust passage 23a becomes more excellent. Furthermore, the present embodiment is directed to an exhaust system in which a quantity of unburned fuel, particulate components, or the like contained in the exhaust gas and adhering onto the pipe wall depends upon the temperature of the pipe wall of the exhaust pipe 23, and then, the concentration distribution is radially changed from the center of the exhaust passage 23a. Consequently, note that the exhaust temperature correction maps illustrated in FIGS. 4 and 5 should be appropriately changed according to the configuration or characteristics of the exhaust system.

Additionally, a change in temperature $T_I$ of the exhaust gas flowing in the exhaust gas heating apparatus 22 adversely influences the second exhaust temperature change ratio $dT_o$ or the increase $\Delta T_o$ in second exhaust temperature, and therefore, it is desirable that the second exhaust temperature change ratio $dT_o$ and the increase $\Delta T_o$ in second exhaust temperature should not be adversely influenced by the change in exhaust temperature $T_I$.

The combustion ratio calculating section 15j subtracts the increase $\Delta T_I$ in first exhaust temperature from the increase $\Delta T_o$ in second exhaust temperature immediately before the exhaust gas is heated, and then, the result is substituted into Equation (7) as the increase $\Delta T_o$ in second exhaust temperature after corrected. The increase $\Delta T_I$ in first exhaust temperature is equal to a value obtained by subtracting the first exhaust temperature $T_{IS}$ immediately before the exhaust gas is heated from the first exhaust temperature $T_I$ at the current point in time. In the same manner, the first exhaust temperature change ratio $dT_I$ is subtracted from the second exhaust temperature change ratio $dT_o$ calculated in the second exhaust temperature change ratio calculating section 15k, and then, the result is substituted into Equation (7) as the second exhaust temperature change ratio $dT_o$ after corrected.

The combustion ratio calculating section 15j calculates a difference $\Delta dT$ ($=dT_o - dT_I$) between the second exhaust temperature change ratio $dT_o$ and the first exhaust temperature change ratio $dT_I$. When the resultant value exceeds a predetermined value S, the combustion ratio Rc is started to be calculated based on Equation (7). Specifically, "immediately before the exhaust gas is heated" indicates a point in time at which the difference $\Delta dT$ between the second exhaust temperature change ratio $dT_o$ and the first exhaust temperature change ratio $dT_I$ exceeds the predetermined value S. As a consequence, the increases $\Delta T_I$ and $\Delta T_o$ in first and second exhaust temperatures and the first and second exhaust temperature change ratios $dT_I$ and $dT_o$ are calculated with reference to the first and second exhaust temperatures $T_{IS}$ and $T_{os}$.

Moreover, the combustion ratio calculating section 15j determines whether or not the exhaust temperature change ratio $dT_o$ after a lapse of a predetermined time t after the start of the fuel addition to the exhaust passage 23a is equal to or greater than a preset threshold θ. If the exhaust temperature change ratio $dT_o$ after the lapse of the predetermined time t after the start of the fuel addition to the exhaust passage 23a is smaller than the preset threshold θ, the fuel combustion ratio $R_C$ is calculated to be 0. In this case, the predetermined time t is equivalent to a flow time of the exhaust gas that reaches a fuel addition region at the exhaust passage 23a, that is, a detection region where the exhaust temperature $T_o$ is detected at the disposition position of the fuel addition valve 22a, or the disposition position of the second exhaust temperature sensor 29. That is to say, when reference character $A_E$ represents a volume of the exhaust passage 23a from the fuel addition region at the exhaust passage 23a to the detection region of the exhaust temperature $T_o$ and reference character q represents the flow rate of the exhaust gas flowing in the exhaust passage 23a per unit time, the predetermined time t can be expressed by the following equation:

$$t = A_E / q \tag{8}$$

Here, the flow rate q of the exhaust gas is calculated by dividing a mass W of intake air per unit time detected by the airflow meter 21 by the density ρ of the exhaust gas. When reference character p represents an exhaust pressure, the density ρ can be expressed by the following equation:

$$\rho = \{1293/(1+0.00367 T_o)\} \cdot (p/101.3).$$

Therefore, Equation (8) can be modified, as follows:

$$t = (1293 p \cdot A_E) / \{101.3 W (1 + 0.00367 T_o)\} \tag{9}$$

The combustion ratio calculating section 15j in the present embodiment corrects the predetermined time t based on the exhaust temperature $T_o$ detected by the second exhaust temperature sensor 29 in accordance with Equation (9).

Meanwhile, the combustion ratio calculating section 15j calculates again the difference $\Delta dT$ between the second exhaust temperature change ratio $dT_o$ and the first exhaust temperature change ratio $dT_I$ after the completion of the fuel addition to the exhaust passage 23a in a quantity set by the fuel addition setting section 15f. At the time when the difference $\Delta dT$ becomes smaller than a predetermined value F, the calculation of the fuel combustion ratio $R_C$ comes to an end. Alternatively, based on a time $t_P$ required for adding the fuel in the quantity set by the fuel addition setting section 15f, counting is started immediately before the exhaust gas is heated, and then, the calculation of the fuel combustion ratio $R_c$ may come to an end at the time when the count result reaches the time $t_P$.

Figure 5:
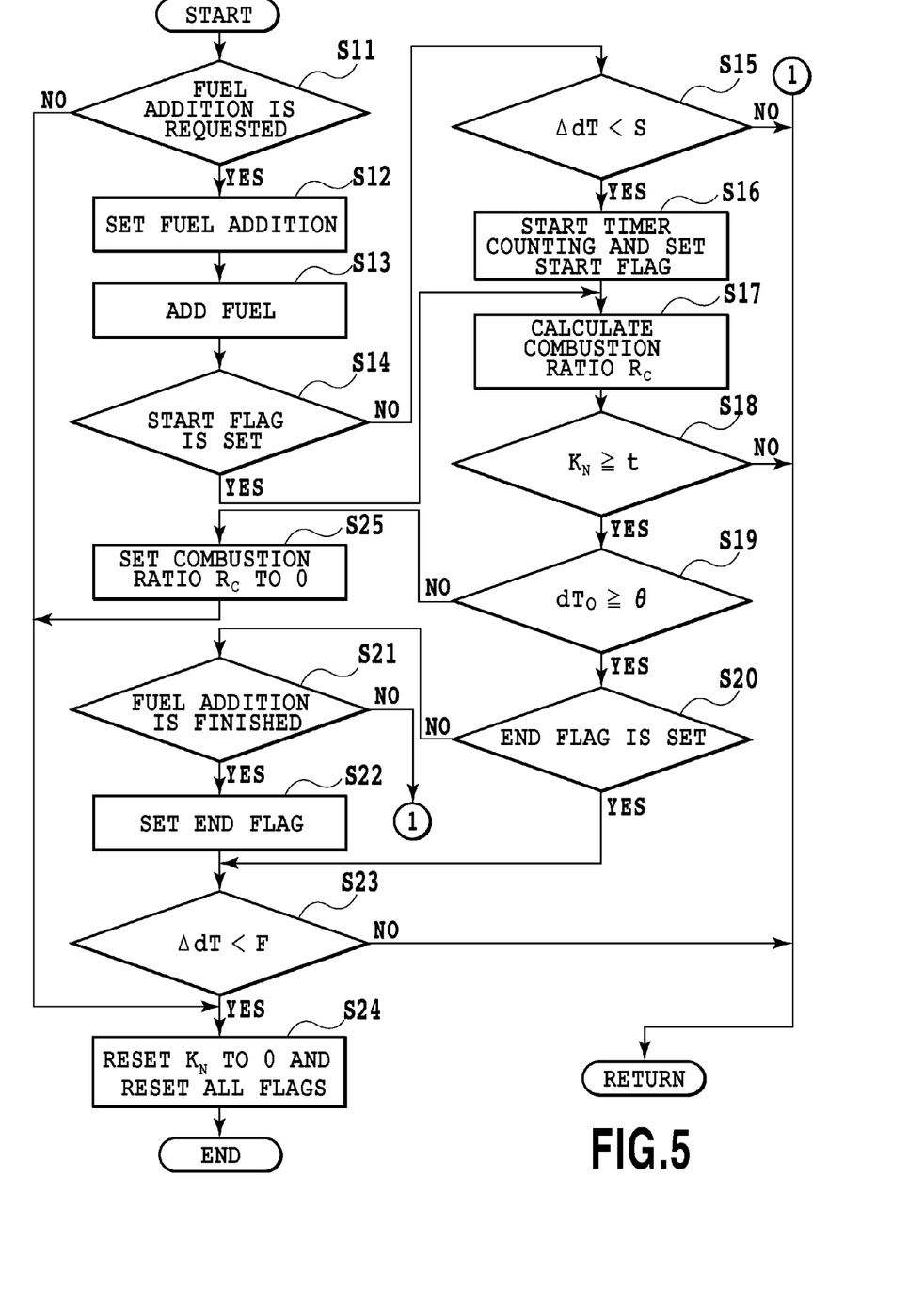
FIG. 5 is a flowchart illustrating procedures of an exhaust gas heating process in the embodiment illustrated in FIG. 1.

Procedures of exhaust gas heating processing in the present embodiment will be schematically illustrated in FIG. 5. Specifically, it is determined in step S11 whether or not the addition of the fuel is demanded. Here, if it is determined that the addition of the fuel is demanded, the fuel addition quantity $Q_F$ or the like is set according to the current operation state of the engine 10 in step S12, before the glow plug 22b is energized, and then, the fuel addition is started in step S13. Next, the process goes to to step S14 where it is determined whether or not a start flag is set. Since the start flag is not set at first, the process goes to step S15 where it is determined whether or not the difference $\Delta dT$ between the second exhaust temperature change ratio $dT_o$ and the first exhaust temperature change ratio $dT_I$ is greater than the predetermined value S. Here, if it is determined that the difference $\Delta dT$ between the second exhaust temperature change ratio $dT_o$ and the first exhaust temperature change ratio $dT_I$ is equal to or smaller than the predetermined value S, that is, an increase in exhaust temperature $T_o$ caused by the ignition of the fuel added to the exhaust passage 23a has not started yet, the process returns to Start, and then, the processing in step S11 onwards is repeated.

In contrast, if it is determined in step S15 that the difference $\Delta dT$ between the second exhaust temperature change ratio $dT_o$ and the first exhaust temperature change ratio $dT_I$ is greater than the predetermined value S, that is, an increase in exhaust temperature $T_o$ caused by the ignition of the fuel added to the exhaust passage 23a has started already, the process goes to step S16 where a timer starts counting, and further, the start flag is set. And then, the combustion ratio $R_C$ is started to be calculated in step S17. Subsequently, it is determined in step S18 whether or not a value $K_N$ counted by the timer reaches the predetermined time t. Since the value $K_N$ counted by the timer does not reach the predetermined time t at first, the process returns to Start, and then, the processing in step S11 onwards is repeated. In this case, in the second process onwards, it is determined in step S14 that the start flag is set, that is, the combustion ratio $R_C$ is being calculated, and therefore, the process jumps to step S17 where the combustion ratio $R_C$ is continuously calculated. In this manner, if it is determined in step S18 that the value $K_N$ counted by the timer reaches the predetermined time t, the process goes to step S19 where it is determined whether or not the exhaust temperature change ratio $dT_o$ after the lapse of the predetermined time t after the fuel addition to the exhaust passage 23a is started is equal to or greater than the threshold θ. Here, if it is determined that the exhaust temperature change ratio $dT_o$ is equal to or greater than the threshold θ, that is, the fuel added to the exhaust passage 23a is normally burned, the process goes to step S20 where it is determined whether or not an end flag is set. Since the end flag is not set at first, the process goes to step S21 where it is determined whether or not the fuel addition to the exhaust passage 23a in the quantity $Q_F$ set in step S12 is finished. Here, if it is determined that the fuel addition to the exhaust passage 23a in the set quantity $Q_F$ is not finished, the process returns to Start, and then, the processing in step S11 onwards is repeated.

In contrast, if it is determined in step S21 that the fuel addition to the exhaust passage 23a in the set quantity $Q_F$ is finished, the process goes to step S22 where the end flag is set. Subsequently, it is determined in step S23 whether or not the difference ΔdT between the second exhaust temperature change ratio $dT_o$ and the first exhaust temperature change ratio $dT_I$ is smaller than the predetermined value F. Here, if the difference ΔdT between the second exhaust temperature change ratio $dT_o$ and the first exhaust temperature change ratio $dT_I$ is equal to or greater than the predetermined value F, that is, there is still an influence by the combustion of the fuel added to the exhaust passage 23a, the process returns to Start, and then, the processing in step S11 onwards is repeated.

If it is determined in step S23 that the difference ΔdT between the second exhaust temperature change ratio $dT_o$ and the first exhaust temperature change ratio $dT_I$ is smaller than the predetermined value F, that is, there is no change in second exhaust temperature $T_o$ caused by the combustion of the fuel added to the exhaust passage 23a, the process goes to step S24. Here, the value $K_N$ counted by the timer is reset to 0, and further, the start flag and the end flag are reset, whereby the calculation of the combustion ratio comes to an end.

In contrast, if it is determined in step S19 that the second exhaust temperature change ratio $dT_o$ is smaller than the threshold θ, that is, the ignition and combustion of the fuel are not conducted for some reason, the process jumps to step S25 where the fuel combustion ratio $R_C$ is calculated to be 0, and then, goes to step S24. Moreover, if it is determined in step S20 that the end flag is set, the fuel addition to the exhaust passage 23a has been already finished, and therefore, the process jumps to previous step S23 where it is determined whether or not the difference ΔdT between the second exhaust temperature change ratio $dT_o$ and the first exhaust temperature change ratio $dT_I$ is smaller than the predetermined value F. Additionally, if it is determined in step S11 that the fuel addition is not demanded, that is, the exhaust gas does not need to be heated, the process jumps to step S24 where the value $K_N$ counted by the timer is reset to 0, and further, the start flag and the end flag are reset, whereby the exhaust gas heating process comes to an end.

Figure 6:
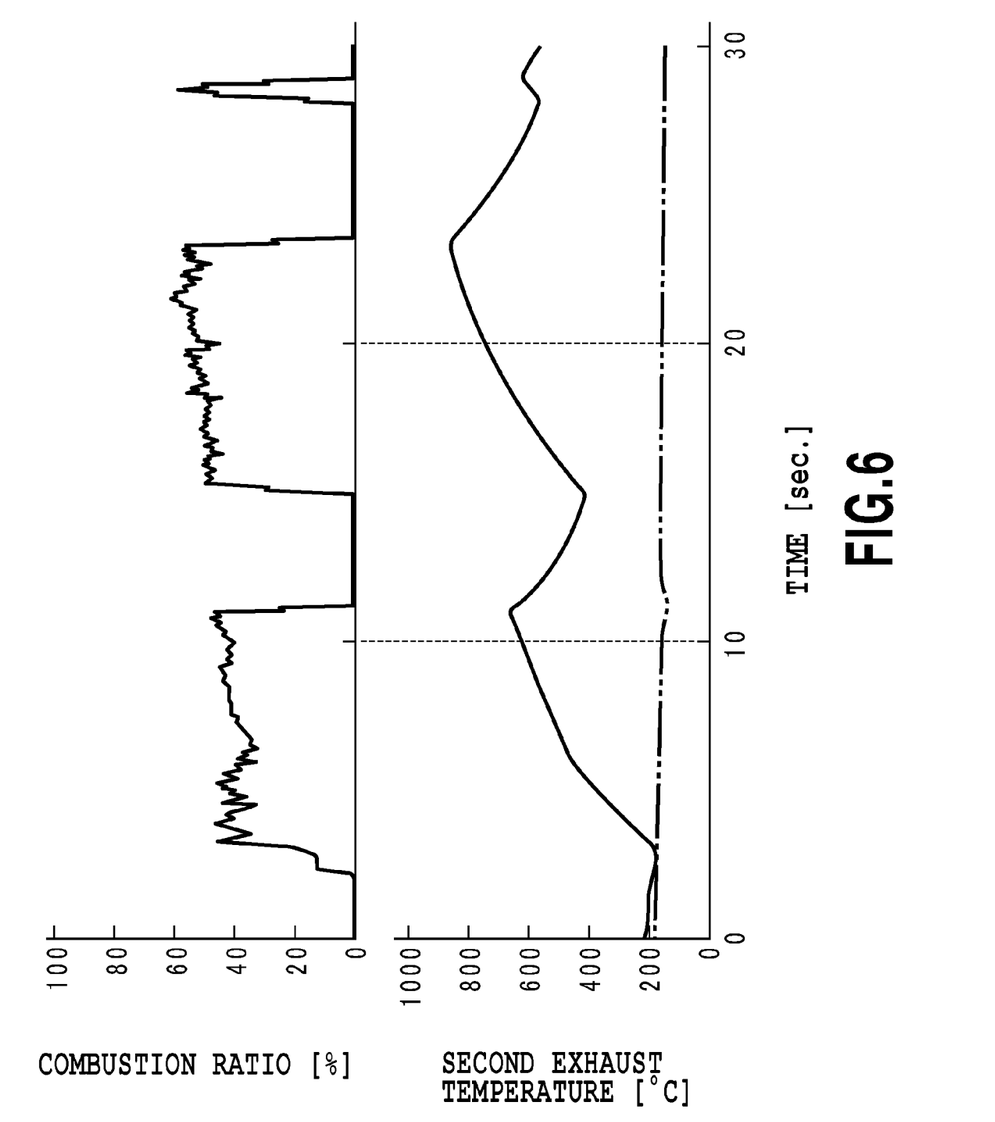
FIG. 6 is a graph schematically illustrating changes in second exhaust temperature and combustion ratio in the embodiment illustrated in FIG. 1.

FIG. 6 schematically illustrates the measurement results of the combustion ratio $R_C$ in the present embodiment. FIG. 6 illustrates the correlation between the change in second exhaust temperature $T_o$ and the combustion ratio $R_C$. Therefore, it is understood that the combustion ratio $R_C$ is continuously measured following the change in exhaust temperature $R_C$. A chain double-dashed line in FIG. 6 schematically indicates the second exhaust temperature $T_o$ in an unburned state.

It should be noted that the present invention should be interpreted based on only the matters described in claims, and in the above-described embodiment, all changes and modifications included within the concept of the present invention can be made other than the described matters. That is to say, all of the matters in the above-described embodiment are made not to limit the present invention, but can be arbitrarily changed according to the application, the object, and the like, including every construction having no direct relation to the present invention.

REFERENCE SIGNS LIST

10 ENGINE
10a COMBUSTION CHAMBER
11 FUEL INJECTION VALVE
12 CYLINDER HEAD
12a INTAKE PORT
12b EXHAUST PORT
13a INTAKE VALVE
13b EXHAUST VALVE
14 ACCELERATOR PEDAL
15 ECU
15a OPERATION STATE DETERMINING SECTION
15b FUEL INJECTION SETTING SECTION
15c FUEL INJECTION VALVE DRIVING SECTION
15d THROTTLE POSITION SETTING SECTION
15e ACTUATOR DRIVING SECTION
15f FUEL ADDITION SETTING SECTION
15g FUEL ADDITION VALVE DRIVING SECTION
15h GLOW PLUG DRIVING SECTION
15i FIRST EXHAUST TEMPERATURE CHANGE RATIO CALCULATING SECTION
15j COMBUSTION RATIO CALCULATING SECTION
15k SECOND EXHAUST TEMPERATURE CHANGE RATIO CALCULATING SECTION
16 ACCELERATOR POSITION SENSOR
17 INTAKE PIPE
17a INTAKE PASSAGE
18 SURGE TANK
19 THROTTLE ACTUATOR
20 THROTTLE VALVE
21 AIRFLOW METER
22 EXHAUST GAS HEATING APPARATUS
22a FUEL ADDITION VALVE
22b GLOW PLUG
23 EXHAUST PIPE
23a EXHAUST PASSAGE
24 CYLINDER BLOCK
24a PISTON
24b CONNECTING ROD
24c CRANKSHAFT
25 CRANK ANGLE SENSOR
26 EXHAUST GAS PURIFYING DEVICE

27 CATALYST TEMPERATURE SENSOR
28 FIRST EXHAUST TEMPERATURE SENSOR
29 SECOND EXHAUST TEMPERATURE SENSOR
30 EXHAUST PRESSURE SENSOR
t PREDETERMINED TIME
F, S PREDETERMINED VALUE
$K_N$ VALUE COUNTED BY TIMER
$Q_F$ FUEL ADDITION QUANTITY (SUPPLY ENERGY QUANTITY)
$R_C$ COMBUSTION RATIO
θ THRESHOLD
ΔdT DIFFERENCE BETWEEN SECOND AND FIRST EXHAUST TEMPERATURE CHANGE RATIOS
$\Delta T_o$ INCREASE IN SECOND EXHAUST TEMPERATURE

The invention claimed is:

1. A combustion ratio calculating method for calculating a combustion ratio of fuel added to an exhaust passage when the fuel is added to the exhaust passage, and then, the fuel added to the exhaust passage is heated to be ignited, so that exhaust gas to be discharged from an internal combustion engine is heated in an exhaust gas heating process, the method comprising the steps of:
  acquiring, by an exhaust temperature sensor, a temperature $T_o$ of the exhaust gas flowing in the exhaust passage located downstream of a region in which the fuel added to the exhaust passage is burned, and sending the temperature $T_o$ to an electronic control unit;
  acquiring, by the electronic control unit, the thermal capacity $C_E$ of the exhaust gas;
  acquiring, by the electronic control unit, a energy quantity $Q_F$ of the fuel supplied to the exhaust passage;
  controlling, by the electronic control unit, a fuel addition valve to add the fuel to the exhaust passage;
  obtaining, by the electronic control unit, an increase $\Delta T_o$ in exhaust temperature $T_o$ immediately before the exhaust gas is heated;
  obtaining, by the electronic control unit, a change ratio $dT_o$ of the exhaust temperature $T_o$ immediately before the exhaust gas is heated;
  acquiring, by the electronic control unit, a parameter Z relevant to the exhaust gas flowing in the exhaust passage;
  calculating, by the electronic control unit, the combustion ratio $R_C$ of the fuel added to the exhaust passage in accordance with the following equation:

$R_C=(C_E/Q_F)(Z \cdot dT_o+\Delta T_o);$ determining, by the electronic control unit, whether or not the change ratio $dT_o$ of the exhaust temperature after a lapse of a predetermined time t after the fuel addition to the exhaust passage is started is equal to or greater than a preset threshold; and
  ending the exhaust gas heating process, by the electronic control unit, when the change ratio $dT_o$ of the exhaust temperature $T_o$ after the lapse of the predetermined time t after the fuel addition to the exhaust passage is started is smaller than the threshold.

2. The combustion ratio calculating method as claimed in claim 1, wherein an exhaust gas purifying device is incorporated on the way of the exhaust passage, the fuel is added to the exhaust passage located upstream of the exhaust gas purifying device, and the exhaust temperature sensor detects the temperature $T_o$ of the exhaust gas flowing in the exhaust passage located upstream of the exhaust gas purifying device.

3. The combustion ratio calculating method as claimed in claim 1, wherein the parameter Z includes at least one of the thermal conductivity $\kappa_S$ of the exhaust temperature sensor per se, the thermal capacity $C_S$ of the exhaust temperature sensor, and the conductivity $\kappa_E$ of heat transmitted from the exhaust gas flowing in the exhaust passage to the exhaust temperature sensor, and further, if $z_1$, $z_2$, $z_3$, $z_4$, and $z_5$ are constants, $Z=z_1 \cdot C_S,$ $Z=z_2 \cdot C_S\{1/(z_3 \cdot \kappa_S)\},$ $Z=z_4 \cdot C_S\{1/(z_5 \cdot \kappa_E)\},$ or $Z=C_S[\{1/(z_3 \cdot \kappa_S)\}+\{1/(z_5 \cdot \kappa_E)\}].$ 4. The combustion ratio calculating method as claimed in claim 1, further comprising the step of:
  correcting the exhaust temperature $T_o$ based on at least either the flow rate $v_E$ of the exhaust gas flowing in the exhaust passage or the exhaust temperature $T_o$.

5. The combustion ratio calculating method as claimed in claim 1, further comprising the steps of:
  acquiring the temperature $T_I$ of the exhaust gas flowing in the exhaust passage located downstream of a combustion chamber in the internal combustion engine and upstream of a region in which the fuel is added to the exhaust passage;
  obtaining an increase $\Delta T_I$ in exhaust temperature $T_I$ immediately before the exhaust gas is heated;
  obtaining the change ratio $dT_I$ of the exhaust temperature $T_I$ immediately before the exhaust gas is heated;
  subtracting the increase $\Delta T_I$ in exhaust temperature $T_I$ from the increase $\Delta T_o$ in exhaust temperature $T_o$ immediately before the exhaust gas is heated, thus correcting the increase $\Delta T_o$ in exhaust temperature $T_o$; and
  subtracting the change ratio $dT_I$ of the exhaust temperature $T_I$ from the change ratio $dT_o$ of the exhaust temperature $T_o$ immediately before the exhaust gas is heated, thus correcting the change ratio $dT_o$ of the exhaust temperature $T_o$.

6. The combustion ratio calculating method as claimed in claim 5, further comprising the step of:
  correcting the exhaust temperature $T_I$ based on at least either the flow rate $v_E$ of the exhaust gas flowing in the exhaust passage or the exhaust temperature $T_o$.

7. The combustion ratio calculating method as claimed in claim 5, further comprising the step of:
  obtaining a difference ΔdT between the change ratio $dT_o$ of the exhaust temperature $T_o$ and the change ratio $dT_I$ of the exhaust temperature $T_I$,
  wherein immediately before the exhaust gas being heated indicates a timing at which the difference ΔdT between the change ratio $dT_o$ and the change ratio $dT_I$ exceeds a predetermined value S.

8. The combustion ratio calculating method as claimed in claim 1, further comprising the step of:
  setting, by the electronic control unit, the combustion ratio of the fuel to be 0 when the change ratio $dT_o$ of the exhaust temperature $T_o$ after the lapse of the predetermined time t after the fuel addition to the exhaust passage is started is smaller than the threshold.

9. The combustion ratio calculating method as claimed in claim 8, wherein the predetermined time t includes a time when the exhaust gas flows from a fuel addition region at the exhaust passage to a detection region in which the exhaust temperature $T_o$ is detected.

10. The combustion ratio calculating method as claimed in claim 8, further comprising the steps of:
- acquiring the volume $A_E$ of the exhaust passage from the fuel addition region at the exhaust passage to the detection region in which the exhaust temperature $T_o$ is detected; and
- acquiring the flow rate q of the exhaust gas flowing in the exhaust passage per unit time,
- wherein the predetermined time t is expressed by the following equation:

$$t = A_E/q.$$

11. The combustion ratio calculating method as claimed in claim 10, wherein when p represents an atmospheric pressure and W represents the mass of the exhaust gas per unit time, the predetermined time t is corrected in accordance with the following equation:

$$t = (1293 p \cdot A_E)/\{101.3 W(1+0.00367 T_o)\}.$$

12. The combustion ratio calculating method as claimed in claim 8, further comprising the step of:
- correcting the predetermined time t based on the exhaust temperature $T_o$ detected by the exhaust temperature sensor.

13. The combustion ratio calculating method as claimed in claim 1, further comprising the step of:
- obtaining the difference $\Delta dT$ between the change ratio $dT_o$ of the exhaust temperature $T_o$ and the change ratio $dT_I$ of the exhaust temperature $T_I$ after the fuel addition to the exhaust passage is finished,
- wherein the step of calculating the combustion ratio $R_c$ of the fuel is finished at a point in time at which the difference $\Delta dT$ between the change ratio $dT_o$ and the change ratio $dT_I$ becomes equal to or smaller than a predetermined value F.

14. The combustion ratio calculating method as claimed in claim 1, wherein the step of calculating the combustion ratio $R_c$ of the fuel is finished after a lapse of time required for adding the fuel to the exhaust passage immediately before the exhaust gas is heated.

* * * * *